US006626158B2

United States Patent
Algeri

(10) Patent No.: US 6,626,158 B2
(45) Date of Patent: Sep. 30, 2003

(54) MIXING DEVICE TO MIX GAS FUEL WITH AIR FOR INTERNAL COMBUSTION ENGINES

(76) Inventor: Ricardo Cayetano Algeri, Camino General Belgrano 439-Tolosa, Provincia de Buenos Aires (AR)

( * ) Notice: Subject to any disclaimer, the term of this patent is extended or adjusted under 35 U.S.C. 154(b) by 210 days.

(21) Appl. No.: 09/903,797

(22) Filed: Jul. 12, 2001

(65) Prior Publication Data

US 2002/0185117 A1 Dec. 12, 2002

(30) Foreign Application Priority Data

Jul. 12, 2000 (AR) ........................................ 00 01 03571

(51) Int. Cl.[7] .............................................. F02B 43/00
(52) U.S. Cl. ..................... 123/527; 239/434.5
(58) Field of Search ................. 123/527; 48/180.1; 239/434.5; 261/51

(56) References Cited

U.S. PATENT DOCUMENTS 2,233,523 A * 3/1941 Forgar ....................... 48/180.1

* cited by examiner

Primary Examiner—Noah P. Kamen

(74) Attorney, Agent, or Firm—Collen IP; Donald J. Ranft

(57) ABSTRACT

A MIXING DEVICE OF GAS FUEL WITH AIR FOR INTERNAL COMBUSTION ENGINES, apt to be inserted in an air supply conduit towards the carburetor, in coaxial arrangement and in direct communication with the air inlet opening of the same carburetor, of the type that comprises a cylindrical and hollow external body inside which a hollow body in the form of a truncated cone is seated, the open base of smaller diameter of the same faces the air inlet opening that defines said external cylindrical body, while its open bigger base corresponds with the outlet opening of the same external cylindrical body, the assembly being completed with a lateral connector pick that projects itself outwards from the same external cylindrical body. The cylindrical and hollow external body presents threaded internal sections near its upper and lower open bases; said threaded sections are the removable fastening means of a threaded ring for regulating the gas input said threaded sections are the removable fastening means of a threaded ring for regulating the gas input and of the above mentioned internal body in the form of a truncated cone which, for that purpose, has an external thread near its bigger open base as well as a connecting pick that is related to the same external cylindrical body by threading; completing the assembly with at least one pair of setscrews that go through the cylindrical wall of the external body to face, respectively, with the threaded sections of the internal body in the form of a truncated cone and with the regulation ring.

3 Claims, 2 Drawing Sheets

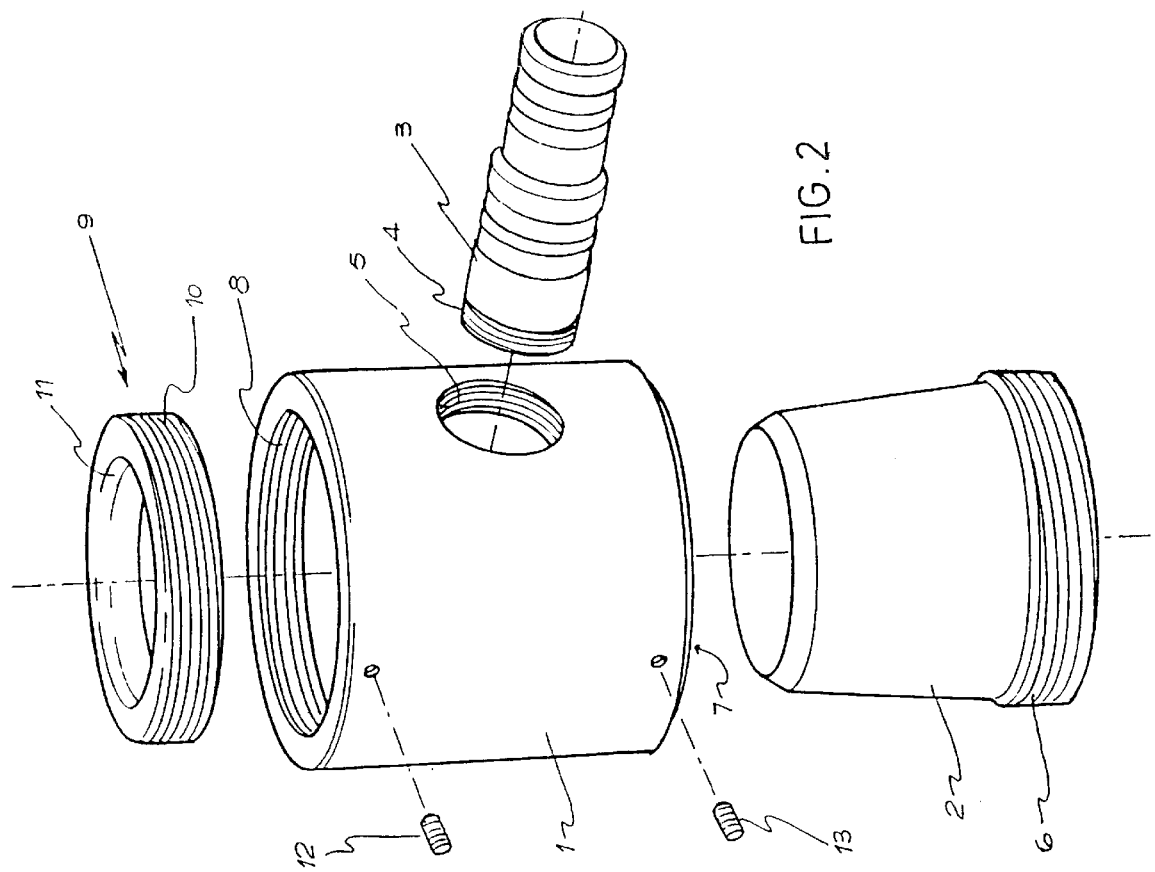
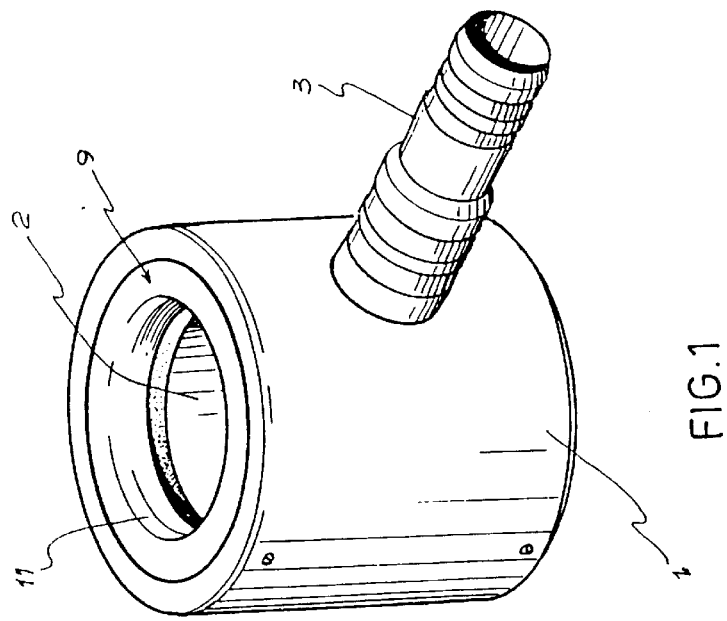

MIXING DEVICE TO MIX GAS FUEL WITH AIR FOR INTERNAL COMBUSTION ENGINES

FIELD OF THE INVENTION

This invention relates to a MIXING DEVICE TO MIX GAS FUEL WITH AIR FOR INTERNAL COMBUSTION ENGINES, that is to say, a mixing device of the type that is interconnected in the air supply circuit towards the carburetor to produce a gas-air mix that is supplied for the explosions.

Most particularly the present invention covers a mixing device specially designed to act on the gas-air mix as a dosing dispenser of the fuel as well as a mixing chamber. Usually, internal combustion engines operate using liquid fuel, thus requiring devices usually referred to as carburetors, the function of the latter is to spray the liquid that will enter into the combustion chamber, dosing it in the necessary ratio for each case and mixing it with a carbureting substance that is precisely ambient air previously filtered prior to its entrance to the carburetor.

Currently the trend is to replace said liquid fuels by gaseous fuels such as liquefied gas—"CLG"; propane; butane or else compressed natural gas—"CNG". Further, many vehicles offer the possibility to alternate between both types of fuels (liquid and gaseous), thus resorting to special fuel selector devices.

BACKGROUND OF THE INVENTION

Several devices of this type are well known, all of them to be engaged in the conduits supplying filtered air towards the carburetor. Some of them are even designed to be incorporated on the carburetor itself over the throttle rod butterfly fins.

In some cases these are picks which are transversely inserted in the air flow passage way, as disclosed in Argentine Patent No. 238-686 property of the company: AMOS GAS MIXERS L.T.D. Specifically, in this document it is mentioned the problem of those gas dispensers and mixers consisting of cylindrical tubes transversely extending towards the interior of the carburetor. It is stated that the mixture is sometimes too rich, thus increasing the carbon settlings inside the combustion chamber. A pick extending across the air inlet conduit into the carburetor is therein proposed and the invention is conditioned to some construction specifications specially created so that the mixture produced be always the most adequate to meet the needs of the engine. It is therein emphasized that the gas dispensing opening is located in the longitudinal central axis of the above mentioned inlet conduit to the carburetor and that the upper face of the above mentioned nozzle is substantially flat while its oblique opening is oriented downwards.

Likewise, other mixing and dispensing devices are well known, many of them of Italian origin, consisting of hollow tubular bodies that are coaxially inserted to the referred filtered air passageway towards the carburetor. All of them operate taking advantage of the draught generated by said air flow towards the carburetor, which also carries the gas fuel which is mixed with said flow so that the greater the requirement of the engine, the greater the airflow to be used and therefore the greater amount of gas to be carried and mixed.

Several different embodiments corresponding to the operation principles stated hereinbefore are well known, since the mixture that can be obtained is very adequate under any operating condition in which the engine is to be used.

These well-known mixing devices are coaxially arranged and in direct communication with the entrance opening to the carburetor and they consist of a hollow tubular body that includes an internal tube in the form of a truncated cone coaxially arranged, which upper base -open and of a smaller diameter-faces the air inlet to the mixer. Likewise, its lower base—bigger in diameter-corresponds to the exit opening of the same hollow tubular body. The mixer is completed with a lateral connector pick that projects outwards from the same hollow tubular body so as to connect to the gas feeding conduit.

In said well-known mixing devices, the above mentioned gas feeding pick allows the entrance of fuel towards an annular chamber that is defined between the walls of said internal hollow body in the form of a truncated cone and the cylindrical wall of the tubular body. This chamber is very useful so that the mixer keeps a minimum gas level arranged to be mixed.

Said annular chamber remains communicated to the filtered air flow through a circumferential opening that conforms in correspondence with the junction between the open upper base and with a lower diameter of the internal body in the form of a truncated cone and the air inlet opening of the hollow tubular body.

It is pointed out that this being a circumferential opening that allows the gas inlet to the filtered air flow, the mix is very homogeneous and direct, so that when the suction is greater there will always exist greater volume of gas to be homogeneously mixed.

However, when using the mixing devices in a generalized manner, some difficulties have arisen, among others we can mention those related to the gas flow required for each case or type of engine.

In fact, one difficulty is that in many cases the mixing device interferes with the air passageway to the carburetor, thus producing non-desired vortexes or chokes especially when the air is required to be mixed with liquid fuel.

Other detected difficulty is that many times the mixer design does not assure that the air inlet is kept constant, above all when the engine consumes liquid fuel.

Other detected difficulty is the great variety of formats and sizes existing in the market, as a consequence of the great amount of models and types of vehicles that appeal to this option of including gas dispensers and mixers. The existing ones are not versatile at all and therefore they can only be adapted to very few models or types of engine.

Other difficulty is that the positioning of the pieces and elements that form part of the mixer cannot be easily regulated so as to position them according to the requirements of use. Above all, the work of the specialized mechanics is particularly difficult and there are even many mixers that do not allow an adjustment of the regulation when already in use.

NOVELTY OF THE INVENTION—MAIN OBJECTIVE

The mixing device this invention refers to belongs to the group that applies the above mentioned coaxial hollow body in the form a truncated cone seated inside a cylindrical body, so that a pick projected outwards from the cylindrical body allows the gas inlet towards an internal chamber that is defined between both bodies.

However, the created device stands up since it holds some building characteristics of its own with which the above indicated problems are clearly solved.

These modifications are expressly oriented to ease the gas flow regulation work that enters the mixing sector. Said work will be very simple and direct so as to simplify the work of the installer and also in case of having to perform modifications to the same when already in use.

Likewise, these building modifications will incorporate means that will be specially used to keep in a very stable condition the relative positioning of the pieces and elements of the mixer during said regulation work.

Consequently, the main objective of this invention patent is a MIXING DEVICE OF GAS FUEL WITH AIR FOR INTERNAL COMBUSTION MOTORS, apt to be inserted in an air supply conduit to the carburetor, in coaxial arrangement and in direct communication with air inlet conduit of the same carburetor, of the type that comprises a cylindrical and hollow external body inside which it is seated a hollow body in the form of a truncated cone, the open base of the same having a smaller diameter faces the air inlet opening that defines said external cylindrical body, in such a manner that its open bigger base corresponds with the outlet opening of the same external cylindrical body, being the set completed with a lateral connector pick that projects itself outwards from the same external cylindrical body, conforming in this way an annular chamber of gas fuel supply, defined between the walls of both coaxial bodies, that communicates with the internal sector of the device through an opening defined by separation that is determined from the upper edge of the smaller base of the internal body in the form of a truncated cone. The invention stand out due to the fact that cylindrical and hollow external body presents threaded internal sections near its upper and lower open bases; said threaded sections are the removable mean of setting of a threaded ring for the regulation of the gas input and of the above mentioned internal body in the form of a truncated cone that, for that purpose, has an external thread near its bigger open base as well as a connecting pick that is related to the same external cylindrical body by threading; completing the set with at least one pair of setscrews that go through the cylindrical wall of the external body to face, respectively, with the threaded sections of the internal body in the form of a truncated cone and with the regulation ring.

Likewise, the threaded internal sections of the external cylindrical body are of the same diameter as the external threading of the body in the form of a truncated cone.

On the other hand, it is additionally highlighted that the communication opening of the annular chamber defined between the walls of both coaxial bodies is determined by the separation between each other of the threaded ring and the body in the form of a truncated cone.

BRIEF DESCRIPTION OF THE DRAWINGS

In order to make concrete the advantages briefly commented above, to which users and experts will be able to add many other ones, and to ease the comprehension of the building/constructive, constitutive and functional characteristics of the invented mixing device, below it will be described a (preferred) example of execution, which is illustrated schematically and without a determined scale, in the attached prints, it is expressly clarified that, precisely, for it being an example, it does not correspond to assign the same with a restrictive or exclusive character of the scope of the protection of this invention, but that it simply has an explicative and illustrative intention of the basic concept on which this invention is founded.

FIG. number 1 is a perspective view that shows a mixing device of gas fuel with air, apt to be inserted in the air inlet conduit towards the carburetor.

Figure 3:
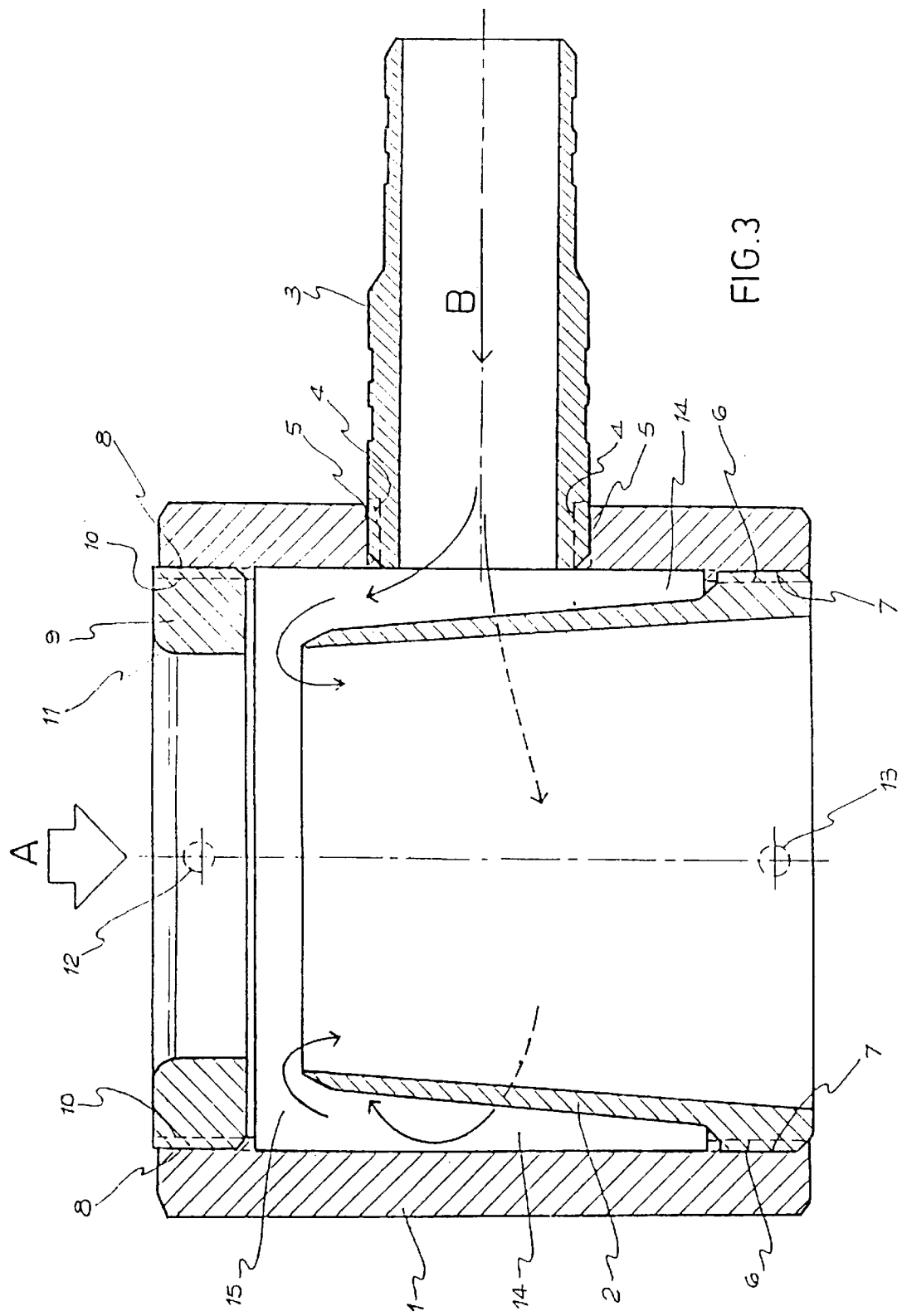

FIG. number 2 is an exploited perspective that allows seeing parts and elements that conform this mixing device that has been invented.

FIG. number 3 is a longitudinal sectional view of the same device that is represented in the previous drawings.

It is stated that in all the drawings, equal reference numbers and letters correspond to the same or equivalent parts or elements constitutive of the set, according to the example chosen for this explanation of the invented mixing device.

DESCRIPTION OF A PREFERRED EXAMPLE

As it can be appreciated in FIG. number 1, the mixing device of gas fuel with air to be incorporated in the supply of internal combustion engines, to which it refers this invention patent, it is of the type that comprises an external cylindrical body -1- open at its bases, that seats inside a tubular body in the form of a truncated cone -2- and includes a lateral pick -3- that projects itself outwards so as to connect to the gas fuel supply conduit.

Observing FIG. number 2 it is possible to explain better which are the intervening pieces and how they are interrelated among them.

As a matter of fact, the above mentioned gas inlet pick has, in its nearby end a threaded section -4- the threading of which fit with the ones of the threaded opening -5- which presents said external body -1- in an intermediate section of its cylindrical wall. Consequently it is a removable pick that allows the quality of allowing the fast disassembly for cleaning and repairing purposes.

Likewise, the internal body in the form of a truncated cone is also removable since, in correspondence with its wider opening it has a threaded section -6- that fits with an internal thread -7- defined in the output open base of the external cylindrical body -1-.

This removable condition that presents the referred body in the form of a truncated cone -2- compared to the external body -1-, not only simplifies repair and cleaning works but also helps with the precision of the regulation work that has to be performed to determine the input rates of the combustible mix and the burning agent that is oriented to the carburetor.

The same external body -1- includes a similar section of threaded internal edge -8- in its other open base, which is created to fix the circular ring -9-, externally threaded (reference -10-) which has a circumferential leading-edge beveled rib -11-. It is a removable regulation ring.

It is specially pointed out that the diameters of the threaded openings -7- and -8- of the external body are equal between each other, so that the body in the form of a truncated cone -2- and the regulating ring -9- can be indistinctly placed in any of the open bases of the before mentioned external cylindrical body. This optional function for the assembly of the mixing device confers it a reversible condition that allows installers greater options of adaptability to the requirements of the engines to which the device can be applied.

The mixer is completed with at least one pair of setscrews -12- and -13- that go through the wall of the body -1- to face, respectively, the threaded sections of the body in the form of a truncated cone -2- and the regulation ring -9-. The presence of these setscrews -12- and -13- has the aim of simplifying the regulation work and, above all, to keep stable the position that is determined for these elements in each regulation. To this respect, it is pointed out that it is a very simple solution for any operator who has to do this job when the mixer is assembled and in use.

Observing the cut of FIG. number 3 it is possible to explain how the invented mixer works and, above all, the advantages that it carries out due to the incorporated building modifications.

In fact, as the arrows indicate, the input of GAS FUEL -B- is produced from the connecting pick -3- to flood, first, the chamber -14- that is determined between the walls of the above mentioned body in the form of a truncated cone -2- and the external cylindrical body -1-.

Said chamber -14- is communicated with the inner part of the device through the height adjustable annular opening -15- so that the incoming fuel mixes with the flow of filtered air that enters from the input conduit represented by arrow -A-. The condition of being an annular opening assures that the mixing action is homogeneous.

According to the operating principle deriving from the above indicated, it can be said that when opening -15-, of constant diameter is at a higher point, the gas input speed to the mix shall be lower; while the lower the opening, the higher the gas input speed to the mixing area. Consequently, in essence, said regulating task is directly related to the higher or lower height of said opening -15-.

The building condition of the body in the form of a truncated cone -2- and the regulation ring -9- being fixed by threading under exposed conditions makes it very simple to determine accurately the height of the above mentioned opening -15-.

No mixing device of this kind well known at present is enabled to vary the height of the passageway opening -15- in the maximum and minimum ranges that this building condition allows. It arises the advantage that the same mixing device is adjustable to different types of engines.

Above all, it is pointed out that regarding these regulations the diameters of the openings through which it enters the air flow and exits the mix flow are always kept constant, which is basic to assure a homogeneous and constant flow under any kind of input supply that an engine may require during operation:

To obtain the position of the ideal height for said opening -15- to be determined for each case, it is enough to adjust setscrews -12- and -13- so as to assure that said position is kept stable and durable.

I claim:

1. MIXING DEVICE OF GAS FUEL WITH AIR FOR INTERNAL COMBUSTION ENGINES, apt to be inserted in an air supply conduit towards the carburetor, in coaxial arrangement and in direct communication with the air inlet opening of the same carburetor, of the type that comprises a cylindrical and hollow external body inside which it is seated a hollow body in the form of a truncated cone, the open base of smaller diameter of the same faces the air inlet opening that defines said external cylindrical body, in such a manner that its open bigger base corresponds with the outlet opening of the same external cylindrical body, being the set completed with a lateral connector pick that projects itself outwards from the same external cylindrical body, conforming this way an annular chamber of gas fuel feeding, defined between the walls of both coaxial bodies, that communicates with the internal sector of the device through an opening defined by the separation that is determined from the upper edge of the smaller base of the internal body in the form of a truncated cone, and wherein the cylindrical and hollow external body presents threaded internal sections near its upper and lower open bases; said threaded sections are the removable fastening means of a threaded ring for regulating the gas input and of the above mentioned internal body in the form of a truncated cone that, for that purpose, has an external thread near its bigger open base as well as a connecting pick that is related to the same external cylindrical body by threading; completing the set with at least one pair of setscrews that go through the cylindrical wall of the external body to face, respectively, with the threaded sections of the internal body in the form of a truncated cone and with the regulation ring.

2. MIXING DEVICE OF GAS FUEL WITH AIR, according to what was claimed under 1.-, wherein the internal threaded sections of the external cylindrical body that are equal in diameter to the external threading of the body in the form of a truncated cone.

3. MIXING DEVICE OF GAS FUEL WITH AIR, according to that justified under 1.-, wherein the height of the communication opening of the annular chamber defined between the walls of both coaxial bodies is determined by the separation between each other of the threaded ring and the body in the form of a truncated cone.

* * * * *